Figure 1:
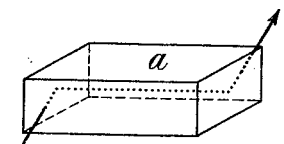

R. STRAUBEL.
OPTICAL TESTING APPLIANCE.
APPLICATION FILED MAR. 23, 1909.

994,962.

Patented June 13, 1911.

UNITED STATES PATENT OFFICE.

RUDOLF STRAUBEL, OF JENA, GERMANY, ASSIGNOR TO THE FIRM OF CARL ZEISS, OF JENA, GERMANY.

OPTICAL TESTING APPLIANCE.

994,962.  Specification of Letters Patent.  Patented June 13, 1911.

Application filed March 23, 1909. Serial No. 485,294.

*To all whom it may concern:*

Be it known that I, RUDOLF STRAUBEL, a citizen of the German Empire, and residing at Carl-Zeiss strasse, Jena, in the Grand Duchy of Saxe-Weimar, Germany, have invented a new and useful Optical Testing Appliance, of which the following is a specification.

The invention consists in an improvement in appliances which serve to test whether a direction laid down by one pencil of parallel rays is parallel to another direction given by a second pencil of parallel rays. Such an appliance consists of a reflecting prism system, by means of which one of the pencils is transferred parallel to its original direction in (or close against) the other pencil, and of a telescope, in which is observed whether the two points, which in the telescopic field of view correspond to the two pencils laid together, coincide. Either pencil can proceed from a very distant point or appear to do so by the rays of a pencil proceeding from a near point being directed parallel by a refractive or a reflective system. When both pencils with the same sign as to direction are situated close against or in each other the observing telescope need have no fixed position to either of the pencils. It is sufficient when the two image points produced by the objective of the telescope from the two pencils lie within the telescopic field of view.

When the device for producing a pencil consists of an objective and a mark arranged in its focus, this device can by means of an ocular be converted into a sighting telescope and the so-completed instrument employed as an observing telescope. Into the pencil appertaining to it the other pencil has therefore to be transferred parallel to its original direction but with a reversed sign as to direction to that of the first pencil. The image point produced in the telescopic field of view from the second pencil then coincides, when both pencils are parallel, with the punctiform sighting mark corresponding to the first pencil. In this case the direction of the first pencil is dependent on the position of the sighting telescope, more accurately expressed, of the objective and the sighting mark.

Whether the observing telescope of the testing appliance be formed as a sighting telescope and receive only one pencil or whether the sighting mark be wanting in it and an image be projected from either of the two pencils into its field of view, in both cases the reflecting prism system can have one or the other of two somewhat different functions to perform, according as to whether the pencil is only to be transferred parallel or at the same time its sign as to direction changed. For performing the first function a pair of optical square prisms have been hitherto employed which deflect the pencil to be transferred twice in the same plane and through the same angle but in opposite directions (*vide* German specification 165510, Figs. 1 and 3), for performing the second, a pair of optical square prisms, which also deflect in the same plane, but twice in the same direction and together through 180° (*vide* German specification 73568, Figs. 1 and 2), or in their place an isosceles right angled prism, the cathetal surfaces serving as the reflecting surfaces (*ibid.* Figs. 3 and 4). Such a reflecting prism system must be carefully adjusted so that its principal plane of section is parallel to the plane of the two pencils. Should the system be deranged in this respect, the coincidence of the points corresponding to the pencils in the telescopic field of view is no longer a proof that the pencils are parallel.

According to the present invention the reflecting prism system is formed, so that no adjustment whatever is required, either in regard to the position of the entire system to the plane of the two pencils or in regard to the relative positions of the component parts of the system, so that a possible alteration also in its position or in the position of one or more of its parts produces no derangement of the appliance in so far as a prejudicial effect upon the accuracy in testing is concerned. This end is attained by selecting as a reflecting prism system an absolute parallel vision prism, *i. e.*, a prism permitting each ray, which succeeds in emerging regularly, to emerge parallel to its direction of entrance, or a combination of such prisms.

Of absolute parallel vision prisms two may be specified here, one for each of the two principal cases of the parallel transference of the pencil of rays: with or without reversing the sign as to direction. A prism, the entrance surface of which is parallel to the exit surface and has two parallel reflecting surfaces, the principal section of which is therefore of rhomboidal form, allows the rays to emerge parallel to the direction of entrance and without alteration of the sign as to direction. A central reflector prism according to Patent 835,648, provided with the surfaces of the solid angle of a cube as reflecting surfaces and one surface for both entrance and exit, permits the rays to emerge parallel to their direction of entrance and in doing so reverses their sign as to direction.

Figure 2:
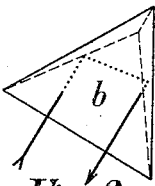
Figure 3:
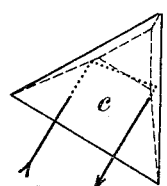
Figure 4:
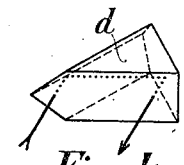
Figure 5:
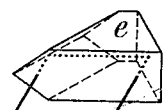
Figure 6:
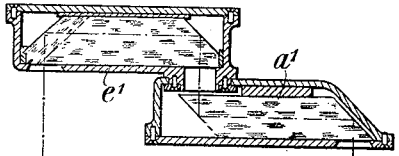
Figure 7:
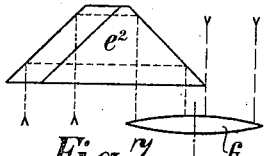
Figure 8:
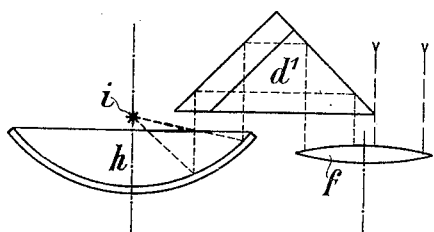
Figure 9:
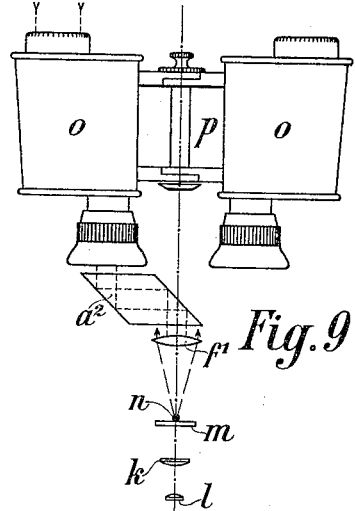
Figure 10:
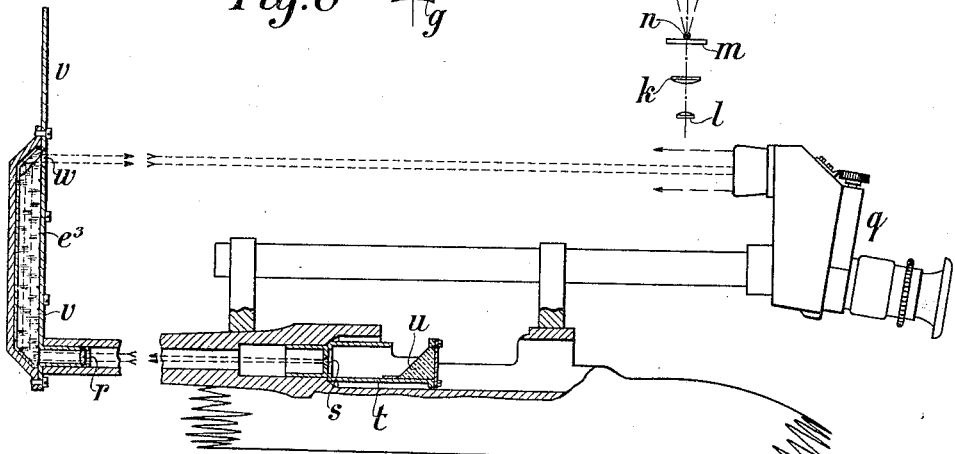

In the annexed drawing: Figure 1 is a perspective view of a rhomboidal prism. Fig. 2 is a perspective view of a central reflector prism. Fig. 3 is a perspective view of a truncated central reflector prism. Fig. 4 is a perspective view of another truncated central reflector prism. Fig. 5 is a perspective view of a third truncated central reflector prism. Fig. 6 is a sectional view of the combination of a prism according to Fig. 5 and a prism according to Fig. 1. Fig. 7 is a diagram of a testing appliance according to the invention. Fig. 8 is a diagram of the same appliance and of a mirror to be tested. Fig. 9 is a diagram of an appliance according to the invention and a plan view of a binocular to be tested. Fig. 10 is a sectional elevation of parts of a rifle with a sighting telescope to be tested and supplemental devices according to the invention.

In the rhomboidal prism $a$ shown in Fig. 1 the simple parallel transference of a ray is indicated. The central reflector prism $b$ in Fig. 2 reverses, in addition to such transference, the sign of the ray as to direction. This prism forms a tetrahedron which according to the above definition of a central reflector prism might have been cut from a cube. Its entrance and exit surface lies at right angles to the diagonal of the cube, hereinafter called the cubic diagonal of the prism, issuing from the point of the solid angle formed by the three reflecting surfaces of the prism. Instead of the complete tetrahedron according to Fig. 2, a prism $c$ according to Fig. 3, which lacks the extremity of the solid angle of cube, as it is truncated parallel to the entrance and exit surface, can also be employed. In the form $d$, Fig. 4, the entrance and exit surface is inclined to the cubic diagonal of the tetrahedron, at other angles than right ones, and two truncations parallel to each other and at right angles to the said surface are provided. The form $e$ in Fig. 5 differs from $d$ only by a third truncation similar to that of form $c$ in Fig. 3.

If two absolute parallel vision prisms, which together form the system, be connected together in such a manner that the exit aperture of the one lies opposite to the entrance aperture of the other and the two prisms be rotatable about the common axis of these apertures, the distance between the entrance aperture and the exit aperture of the entire system can by this means be regulated. In Fig. 6 the prisms connected by such a hinge are a rhomboidal prism $a^1$ and a central reflector prism $e^1$. This combination answers the special condition that the pencil in parallel transference receives simultaneously a reversed sign as to direction.

The improved testing appliance according to the present invention is first of all applicable in every case where the former one had already been utilized, for example, as a component of the telemeters with adjusting device represented in the aforesaid German specifications, 165510 (Figs. 1 and 3) and 73568 (Fig. 1). That part of the entire system reproduced in the said specifications, which forms the testing appliance dealt with in this one, consists of the adjusting prism system and one of the two telescopes of the telemeter which are provided with sighting or adjusting marks. In 165510 it is that telescope into which the parallel transferred pencil enters. In 73568, where each telescope receives the pencil coming from the other one, it is that telescope which is selected for observation during adjustment.

In the diagrammatic Figs. 7 to 10 the solution of some other practical problems by means of the improved testing appliance is shown. Each pencil is represented by two parallel lines, one by long and the other by short dashes.

In the example shown in Fig. 7 the testing appliance consists of a central reflector prism $e^2$ and a Galilean telescope $f\ g$. One pencil has proceeded from a distant object point at the back of the observer, the other is derived from a distant object point in front. The test shows whether the position of the observer is in alinement between the two object points.

According to Fig. 8 a similar testing appliance, but equipped with another prism $d^1$, permits of determining whether a parabolic mirror $h$, in the focal point of which a source of light is arranged, is directed with its axis on the distant object point, the image of which for the observer then disappears in the image of the source of light $i$.

In Fig. 9 the testing appliance is composed of a rhomboidal prism $a^2$ and an astronomical telescope $f^1\ k\ l$ with mark plate $m$ and sighting mark $n$. In this case the appliance is intended to serve for investigating whether the optical axes of the binocular telescope $o\ o$ are parallel to the axis of its hinge $p$. Before applying the prism $a^2$ the sighting telescope is directed on a far distant object point and fixed in this position. Thereupon the binocular telescope to be tested is placed in front of the sighting telescope, so that the axis of the hinge of the double telescope coincides with the sighting line, and prism $a^2$ is interposed between a single telescope and the sighting telescope. If then the optical axis of the single telescope is also directed on the far distant object point, the image of this point, which is projected on the mark plate $m$ by the optical parts of the single telescope, the prism $a^2$ and the objective $f^1$ of the sighting telescope, must coincide with the mark $n$.

Finally in Fig. 10 a testing appliance is combined with a Mauser rifle, the telescope of which appliance consists of a sighting telescope $q$, which forms the aiming device of the rifle. The object of the appliance is to ascertain whether the zero position of the sighting line is parallel to the axis of the bore of the rifle. A pencil giving the direction of the axis of the bore is therefore produced by an objective $r$ arranged in the muzzle and a small aperture $s$ lying at the objective focal length away. This aperture lies in the middle of the transverse wall of a sleeve $t$, which, after withdrawing the breech block, has been inserted into the cartridge chamber. An inclined reflecting surface $u$ deflects light from the sky upon the aperture $s$. The casing of the prism $e^3$ is connected with the casing of the objective $r$. The cover $v$ of this prism casing is constructed as a dead black screen which surrounds the exit aperture $w$, so that in the sighting telescope only the image of the aperture $s$ is visible. This image falls in the sighting mark, when the line of sight is adjusted parallel to the axis of the bore.

I claim:

1. Appliance for testing whether a pencil of parallel rays is parallel to a second pencil of such rays, consisting of a reflecting prism system and a telescope, the reflecting prism system comprising only absolute parallel vision prisms.

2. Appliance for testing whether a pencil of parallel rays is parallel to a second pencil of such rays, consisting of a reflecting prism system and a telescope, the reflecting prism system consisting of two absolute parallel vision prisms hinged together so as to allow regulation of the distance between the entrance aperture and the exit aperture of the system.

RUDOLF STRAUBEL.

Witnesses:
 PAUL KRÜGER,
 FRITZ LANDER.

Copies of this patent may be obtained for five cents each, by addressing the "Commissioner of Patents, Washington, D. C."